(12) United States Patent
Kumar et al.

(10) Patent No.: US 11,159,355 B2
(45) Date of Patent: Oct. 26, 2021

(54) SYNCHRONIZATION SIGNAL DESIGN FOR NARROWBAND INTERNET OF THINGS COMMUNICATIONS

(71) Applicant: INTEL IP CORPORATION, Santa Clara, CA (US)

(72) Inventors: Utsaw Kumar, Foster City, CA (US); Seunghee Han, San Jose, CA (US); Debdeep Chatterjee, Mountain View, CA (US); Ralf Bendlin, Portland, OR (US)

(73) Assignee: APPLE INC., Cupertino, CA (US)

( * ) Notice: Subject to any disclaimer, the term of this patent is extended or adjusted under 35 U.S.C. 154(b) by 129 days.

(21) Appl. No.: 15/766,772

(22) PCT Filed: Jun. 29, 2016

(86) PCT No.: PCT/US2016/040122
§ 371 (c)(1),
(2) Date: Apr. 6, 2018

(87) PCT Pub. No.: WO2017/078802
PCT Pub. Date: May 11, 2017

(65) Prior Publication Data
US 2018/0295007 A1 Oct. 11, 2018

Related U.S. Application Data

(60) Provisional application No. 62/252,362, filed on Nov. 6, 2015.

(51) Int. Cl.
*H04L 5/14* (2006.01)
*H04L 27/18* (2006.01)
(Continued)

(52) U.S. Cl.
CPC ...... *H04L 27/2613* (2013.01); *H04J 11/0076* (2013.01); *H04L 5/00* (2013.01);
(Continued)

(58) Field of Classification Search
CPC ......... H04L 27/2613; H04L 5/00; H04L 5/14; H04L 27/18; H04L 27/2655; H04L 27/2692; H04J 11/0076; H04J 13/0062
See application file for complete search history.

(56) References Cited

U.S. PATENT DOCUMENTS 8,320,360 B2 * 11/2012 Fukuta ................ H04L 27/2655
370/350
8,416,710 B2 * 4/2013 Brisebois .............. H04W 24/00
370/254
(Continued)

FOREIGN PATENT DOCUMENTS

CN        103596262       2/2014
CN        103596262 A    2/2014
(Continued)

OTHER PUBLICATIONS

PCT Application No. PCT/US2016/040122, Notification Concerning Transmittal of International Preliminary Report on Patentability, dated May 17, 2018, 11 pgs.
(Continued)

*Primary Examiner* — Huy D Vu
*Assistant Examiner* — Bailor C. Hsu
(74) *Attorney, Agent, or Firm* — Womble Bond Dickinson (US) LLP

(57) ABSTRACT

A synchronization signal design is described for narrowband Internet of Things Communications. The synchronization signals facilitate time and frequency synchronization between an eNB and UEs. In one example, operations include generating an NB-Iot Secondary Synchronization
(Continued)

Signal (N-SSS) using a Zadoff-Chu (ZC) sequence, scrambling the ZC sequence using a scrambling sequence, and transmitting the resulting scrambled NB-Iot Secondary Synchronization Signal (N-SSS) by the eNB in a periodic manner, wherein, the eNB has a cell identifier and the cell is identified by a combination of the root of the ZC sequence and the scrambling sequence.

18 Claims, 5 Drawing Sheets

(51) Int. Cl.
*H04L 27/26* (2006.01)
*H04L 5/00* (2006.01)
*H04J 11/00* (2006.01)
*H04J 13/00* (2011.01)

(52) U.S. Cl.
CPC .............. *H04L 5/14* (2013.01); *H04L 27/18* (2013.01); *H04L 27/2655* (2013.01); *H04L 27/2692* (2013.01); *H04J 13/0062* (2013.01)

(56) References Cited

U.S. PATENT DOCUMENTS

| | | | | |
|---|---|---|---|---|
| 8,614,994 | B2* | 12/2013 | Swarts | H04J 11/0069 370/336 |
| 8,625,526 | B2* | 1/2014 | Han | H04L 12/189 370/330 |
| 8,768,359 | B2* | 7/2014 | Luo | H04J 11/0069 455/436 |
| 8,902,858 | B2* | 12/2014 | Liu | H04J 11/0069 370/335 |
| 8,982,911 | B2* | 3/2015 | Chang | H04W 56/00 370/503 |
| 9,258,104 | B2* | 2/2016 | Bashar | H04W 24/08 |
| 9,451,570 | B2* | 9/2016 | Cheng | H04W 8/005 |
| 9,674,808 | B1* | 6/2017 | Patel | H04W 56/0015 |
| 9,894,626 | B2* | 2/2018 | Abedini | H04W 56/001 |
| 9,955,442 | B2* | 4/2018 | Gaal | H04W 56/00 |
| 9,998,250 | B2* | 6/2018 | Adhikary | H04J 11/0069 |
| 10,341,078 | B2* | 7/2019 | Chawa | H04W 4/70 |
| 2014/0022988 | A1* | 1/2014 | Davydov | H04W 88/02 370/328 |
| 2014/0226649 | A1* | 8/2014 | Webb | H04L 5/0023 370/350 |
| 2014/0233457 | A1 | 8/2014 | Koutsimanis et al. | |
| 2015/0173068 | A1 | 6/2015 | Han et al. | |
| 2016/0212721 | A1* | 7/2016 | Sheng | H04W 76/14 |
| 2017/0034798 | A1* | 2/2017 | Lin | H04L 5/001 |
| 2017/0093540 | A1* | 3/2017 | Lei | H04L 27/2613 |
| 2017/0094621 | A1* | 3/2017 | Xu | H04W 56/001 |
| 2017/0135052 | A1* | 5/2017 | Lei | H04L 5/0048 |
| 2017/0223652 | A1* | 8/2017 | Ko | H04L 69/22 |
| 2018/0227897 | A1* | 8/2018 | Yeo | H04W 84/04 |
| 2018/0309611 | A1* | 10/2018 | Ko | H04J 13/00 |
| 2019/0028243 | A1* | 1/2019 | Kim | H04L 27/2613 |
| 2019/0058620 | A1* | 2/2019 | Liu | H04L 5/0053 |

FOREIGN PATENT DOCUMENTS

| | | |
|---|---|---|
| CN | 104202712 | 12/2014 |
| CN | 104202712 A | 12/2014 |

OTHER PUBLICATIONS

Qualcomm Incorporated, 'Sequence Design for NB-IOT SYNC Channel' R1-155747, 3GPP TSG WG1 #82 Bis, Malmo, Sweden, Sep. 30, 2015, 4 pgs.
ZTE, Considerations on Synchronization Signal Design of NB-IoT, R1-155994, 3GPP TSG RAN WG1 #82bis, Malmo, Sweden, Sep. 30, 2015, 4 pgs.
Sansung, 'Narrowband IoT—Synchronization Design', R1-155509, 3GPP TSG RAN WG1 #82bis, Malmo, Sweden, Sep. 30, 2015, 6 pgs.
Qualcomm Incorportated, 'Design Principles for NB-IoT SYNC Channel', R1-155764, 3GPP. TSG, RAN, WG1 #82 Bis, Malmo, Sweden, Sep. 30, 2015, 7 pgs.
P93446PCT Notification of Entering the Substantive Examination Phase, dated Nov. 12, 2018, (2 pages).
Korean IP Office, International Search Report of the International Searching Authority, dated Oct. 11, 2016 for related International Application No. PCT/US2016/040122 (6 pgs).
Korean IP Office, Written Opinion of the International Searching Authority, dated Oct. 11, 2016 for related International Application No. PCT/US2016/040122 (9 pgs).
Qualcomm Corporation, "Design Principles from NB-IoT SYNC Channel." R2-155746, 3GPP TSG-RAN WG1 Meeting #82bis, Malmo, Sweden, Oct. 5-9, 2015.
Qualcomm Corporation, "Sequence Design for NB-IoT SYNC Channel." R2-155747, 3GPP TSG-RAN WG2 Meeting #82bis, Malmo, Sweden, Oct. 5-9, 2015.
Samsung, "Narrowband IoT—Synchronization Design." R2-155509, 3GPP TSG-RAN WG1 #82bis, Malmo, Sweden, Oct. 5-9, 2015.
ZTE, "Considerations on Synchronization Signal Design of NB-IoT." R4-155995, 3GPP TSG-RAN WG1 #82bis, Malmo, Sweden, Oct. 5-9, 2015.
PCT International Search Report for PCT/US2016/040122 dated Oct. 11, 2016.
PCT Written Opinion of the International Searching Authority for PCT/US2016/040122, dated Oct. 11, 2016.
Chinese Office Action and Search Report for Application No. 2016800620995, dated Aug. 25, 2020, 16 pages.
Qualcomm Incorporated: "Sequence Design for NB-IOT SYNC Channel" 3GPP Draft; R1-155747, RD Generation Partnership Project (3GPP)), Mobile Competence Centre ; 650, Route Des Lucioles ; F-06921 Sophia-Antipolis Cedex ; France •vol. RAN WGl, No. Malmo, Sweden; Oct. 5, 2015-Oct. 9, 2015 (Oct. 5, 2015), Retrieved from the Internet: URL:https://www.3gpp.org/ftp/tsg_ran/WG1_RL1/TSGR1_84b/Docs [Retrieved on Oct. 5, 2015 ].
First Office Action of the China National Intellectual Property Administration dated Aug. 25, 2020 for related Chinese Patent Application No. 201680062099.5.
Second Office Action and Search Report of the China National Intellectual Property Administration dated May 8, 2021 for related Chinese Patent Application No. 201680062099.5.
Qualcomm Incorporated Sequence Design for NB-IOT SYNC Channel "3GPP TSG RAN WG1 #82 BIS: R1-155747 ", Oct. 5-9, 2015.
Global System for Mobile Communications 7.1.2.1.2.5 SSS generation "Draft(234)3GPP Release 13 75, TR 45.820 VI.12.0 1", Apr. 30, 2015.

* cited by examiner

SYNCHRONIZATION SIGNAL DESIGN FOR NARROWBAND INTERNET OF THINGS COMMUNICATIONS

CROSS-REFERENCE TO RELATED APPLICATIONS

This patent application is a U.S. National Phase application under 35 U.S.C. § 371 of International Application No. PCT/US2016/054768, filed Sep. 30, 2016, entitled RRM REQUIREMENT FOR D2D INTER-CARRIER DISCOVERY GAP, which claims priority to U.S. Provisional Application No. 62/252,362, filed Nov. 6, 2015, entitled SYNCHRONIZATION SIGNAL DESIGN FOR NB-IOT, the priority of which are hereby claimed, both of which are incorporated by reference.

FIELD

The present description relates to the field of wireless communications and in particular to transmitting identification information in synchronization signals.

BACKGROUND

In the existing LTE (Long Term Evolution) specification, downlink synchronization signals consist of a PSS (Primary Synchronization Signal) and a SSS (Secondary Synchronization Signal). The PSS and SSS are transmitted in the central 6 PRBs (Physical Resource Blocks), which allows UEs to synchronize without any a priori knowledge of the allocated bandwidth. The PSS and SSS are comprised of sequences of length 62 each, mapped to the central 62 subcarriers around the DC (Direct Conversion or zero frequency) subcarrier. PSS sequences are repeated twice in 10 ms (milliseconds) and are used to attain time synchronization and correct frequency offset estimates. Additionally, PSS sequences provide one of the 3 cell IDs (Cell Identifier). The cell IDs are used to identify a particular transmitting eNB or other type of transmitting access point. The two SSS sequences are unique and provide frame synchronization information as well as information about 1 out of the 168 cell IDs.

At the 3GPP (third generation partnership project) RAN #69 meeting, a new WI (work item) on specification support for NB-IoT (Narrowband Internet of Things) was approved with the objective of supporting low complexity devices that support 180 kHz (kilohertz) UE (user equipment) RF (radio frequency) bandwidth. Further, it was agreed as one of the objectives of the WI, to support a single synchronization signal design for three different modes of operation: (1) standalone deployment; (2) NB-IoT deployment in the guard interval of an LTE carrier; and (3) NB-IoT deployed in-band.

Cell search procedure in NB-LTE can be achieved via primary and secondary synchronization signal transmissions by the NB-LTE base stations. Cell search is used in LTE to acquire OFDM (Orthogonal Frequency Division Multiplex) symbol time, frame and frequency synchronization at the UE, while also allowing the UE to detect a Cell ID.

In LTE, 504 unique cell IDs are supported, and these are further divided into 168 cell ID groups, with three cell IDs within each group. The PSS is used to acquire OFDM symbol time and frequency synchronization, while also providing one of the three cell identity groups. The SSS is used to detect the frame boundary as well as 1 out of the 168 cell IDs, which in combination with the cell identity group from PSS gives the Cell ID of the base station.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Various example embodiments provide options for the design of an N-SSS sequence for a reduced complexity NB-LTE receiver, such as a NB-IoT device, a machine-type communications (MTC) device, and/or other suitable electronic devices. Aspects of the example embodiments for the N-SSS design include using N-PSS to detect timing/frequency offset estimates. In addition, the example embodiments use multiple N-PSS sequences to convey information indicating the mode of operation of the NB-IoT carrier, which may include standalone, in-band, and/or guard-band modes.

Example embodiments also provide various options to generate the N-SSS. In some embodiments, Zadoff-Chu sequences are used to generate in the frequency domain for N-SSS. To cover N different Cell IDs, a combination of different root indices and scrambling sequences may be used. To indicate time index related information of N-SSS sequences in time, time-domain cyclic shifts of the above mentioned sequences may be utilized. The example embodiments also provide methods using multiple PSS sequences to convey information indicating the mode of operation of the NB-IoT carrier, which may include standalone, in-band or guard-band. Modified PSS and SSS sequences are referred to herein as N-PSS and N-SSS to indicate that these versions of PSS and SSS are modified for NB-IoT as compared to conventional LTE PSS and SSS.

Downlink Synchronization in PRBs

Cell search in NB-IoT can follow the same design principles as in LTE, but with certain modifications to reduce device complexity and enhance cell search capabilities. Two of these modifications are new synchronization signals.

1) N-sequence PSS (N-PSS): Only one N-PSS is used to derive the Cell ID. The N-PSS can span over multiple symbols and is used to detect symbol timing and to correct the frequency offset.

2) N-sequence SSS (N-SSS): The N-SSS is used to achieve frame synchronization and to detect one out of the N cell Ids.

Figure 1:
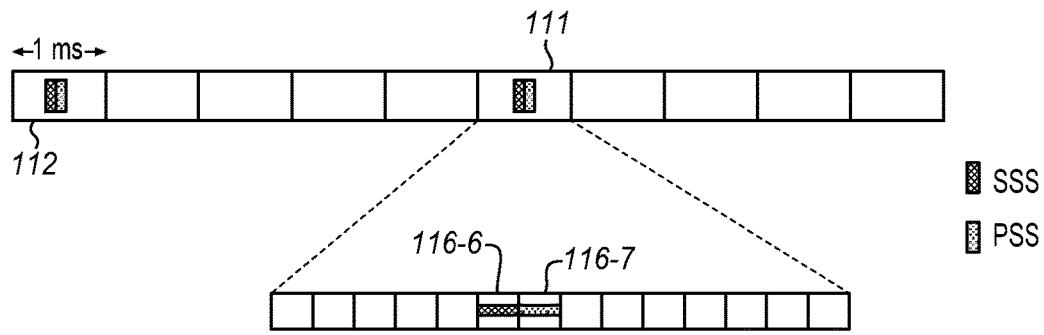
FIG. 1 is a diagram of time domain locations of PSS (Primary Synchronization Signal) and SSS (Secondary Synchronization Signal) transmissions for an FDD (Frequency Division Duplex) system in IOT (Long Term Evolution) wireless communications system.

FIG. 1 is a diagram of time domain locations of PSS and SSS transmissions for an FDD (Frequency Division Duplex) system in LTE. Time is shown on the horizontal axis and each rectangle represents a PRB. As shown, an SSS, PSS sequence is sent in every sixth PRB 112, 111. The sixth PRB is expanded into sub-blocks 116 to show the location of the SSS in sub-block 116-6 and the PSS in sub-block 116-7.

The downlink synchronization signals consist of PSS and SSS. The PSS and SSS are transmitted in the central 6 PRBs, which allows UEs to synchronize without any a priori knowledge of the allocated bandwidth. The PSS and SSS are comprised of sequences of length 62 each, mapped to the central 62 subcarriers around the DC subcarrier. IN particular, the PSS has a length-63 sequence, but one of the 63 elements is punctured making it 62. The LTE SSS has length-62 sequences comprised of two length-31 codes. PSS sequences are repeated twice in 10 ms (milliseconds) and are used to attain time synchronization and correct frequency offset estimates. Additionally, they provide one of the 3 cell IDs. The two SSS sequences are unique and provide frame synchronization information as well as information about 1 out of the 168 cell IDs. The time domain location of the PSS and SSS for FDD system is illustrated in FIG. 1.

The PSS is constructed from a frequency-domain Zadoff-Chu (ZC) sequence of length 63. The SSS sequences are generated according to maximum length sequences (M-sequences), which can be created by cycling through every possible state of a shift register of length n. Note that the detection of the PSS and SSS enables time and frequency synchronization, provides the UE with the physical layer identity of the cell and the cyclic prefix length, and informs the UE whether the cell uses FDD or TDD (Time Division Duplex).

NB-LTE Cell Search

Assuming a value of N cell IDs to support, as indicated earlier, N-PSS does not provide information about the cell identity as in LTE. N-PSS merely provides time synchronization and is used to estimate and compensate for frequency offsets. Example embodiments provide different configurations of N-SSS to define FDD/TDD configurations in NB-LTE.

N-SSS Sequence Generation

The N-SSS signal may be generated in the frequency domain, and occupies $N_{SC}=12$ subcarriers and is spread across $N_{SSS}$ OFDM symbols. In the example embodiments, $N_{SSS}=6$ is assumed, however, any other value may be used. The N-SSS is composed of $N_{ZC}$ length ZC sequences, where $N_{ZC}$ is chosen to be a prime number to maximize the number of available ZC sequences with relatively good cross-correlation properties. Equations 1 and 2 represent two different options for $N_{ZC}$ when $N_{SSS}=6$:

$$N_{ZC} < N_{SSS}*N_{SC}, \text{ e.g., } N_{ZC} < 72 \text{ when } N_{SSS} = 6 \text{ and } N_{SC} = 12 \quad \text{(Eq. 1)}$$

Alternatively, $N_{SSS}=11$ to provide 132 resource elements instead of 72. Different values may be used to suit different systems. For e.g., $N_{ZC}=67$, 71, etc. There are two ways of extending the sequence length to occupy $N_{SSS}*N_{SC}$ resource elements when $N_{ZC} < N_{SSS} N_{SC}$. In this case, $N_{ZC}$ can to be chosen as the highest prime number less than $N_{SSS}*N_{SC}*S_{SSS}$.

1. The sequence can be padded with enough zeros to occupy $N_{SSS}*N_{SC}$ resource elements.

2. The sequence can be cyclically extended to the required length, i.e. to occupy all of the $N_{SSS}*N_{SC}$ resource elements.

On the other hand when $N_{ZC} > N_{SSS}*N_{SC}$, then, $N_{ZC}$ may be chosen as the least prime number that is greater than $N_{SSS}*N_{SC}*S_{SSS}$. This may be implemented as follows:

$$N_{ZC} > N_{SSS}*N_{SC}, \text{ e.g., } N_{ZC} > 132 \text{ when } N_{SSS} = 11 \text{ and } N_{SC} = 12: \quad \text{(Eq. 2)}$$

For e.g., $N_{ZC}=133$. These sequences are truncated to occupy $N_{SSS}*N_{SC}$ resource elements.

To support N cell IDs, example embodiments provide the use of different root indices and scrambling codes. This N-SSS sequence is placed at d different locations within a Tms M-frame. For example, FIG. 2 and FIG. 3 indicate the N-PSS and N-SSS placement for d=4 and d=8, respectively, repetitions within a T=80 ms M-frame. Other values of d may alternatively be used to suit different applications. To differentiate between these different N-SSS locations, d different cyclic time shifts are applied to the frequency domain ZC sequence for frame synchronization information.

Figure 2:
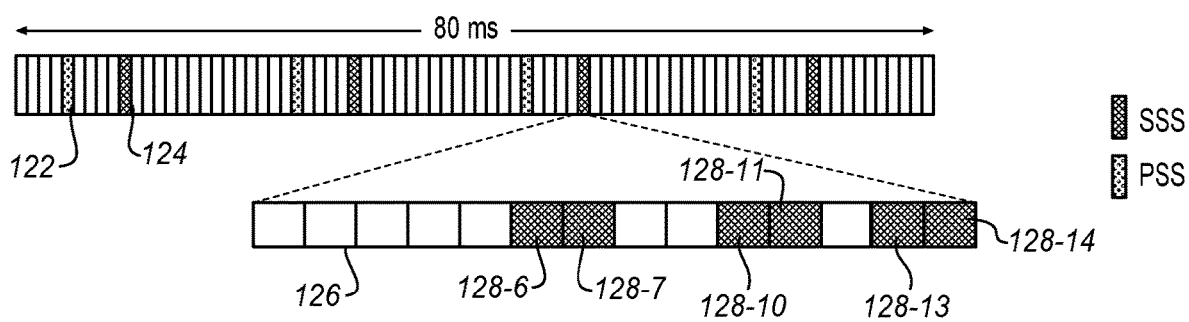
FIG. 2 is a diagram of a frame for wireless communication with physical resource blocks from left to right through time on the horizontal axis according to an embodiment.

FIG. 2 is a diagram of an 80 ms frame with PRBs from left to right through time on the horizontal axis. A time domain location of N-PSS 122 and N-SSS 124 transmissions is shown for NB-Iot (d=4). A PRB 126 that contains an N-SSS is expanded to show the locations of N-SSS sequences in the sub-blocks of a particular PRB in sub-block 128-6, 7, 10, 11, 13, and 14. Different sub-blocks may be used to suit different circumstances. In one embodiment the last 11 sub-blocks are used but any number of sub-blocks and any particular sub-blocks may be selected to carry the N-SSS sequences.

Figure 3:
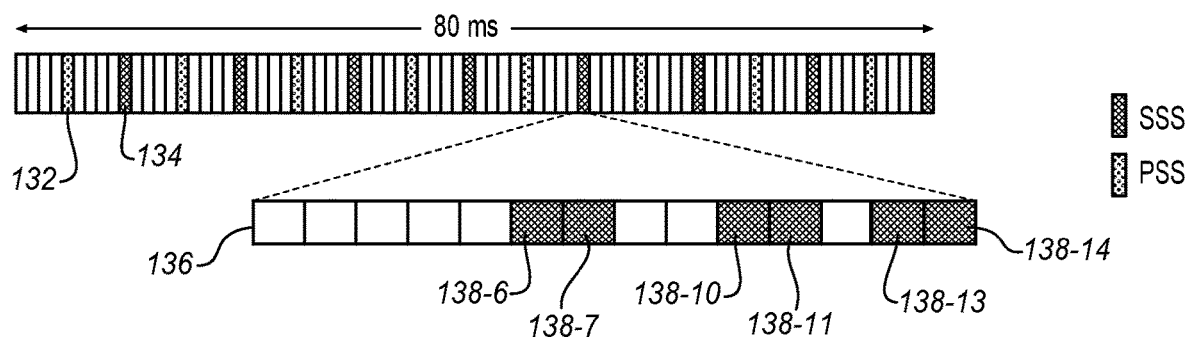
FIG. 3 is a diagram of an alternative frame for wireless communication with physical resource blocks from left to right through time on the horizontal axis according to an embodiment.

FIG. 3 is a diagram of an 80 ms frame with PRBs from left to right through time on the horizontal axis. A time domain location of N-PSS 132 and N-SSS 134 transmissions is shown for NB-Iot (d=8). A PRB 136 that contains an N-SSS is expanded to show the locations of N-SSS sequences in the sub-blocks of a particular PRB in sub-block 138-6, 7, 10, 11, 13, and 14.

Embodiments of a sequence design for an N-SSS sequence supporting N cell IDs, are provided below. In some embodiments N=504, but other values may be used to suit different applications. The following are some features of the example embodiments:

A combination of the root of the ZC sequence and a scrambling code may be used to represent the cell ID of a cell. Specifically, a root index, denoted here as $m_p$ and a scrambling sequence index, denoted here as $k_p$ uniquely represent a cell ID p, where $$m_p = 1 + \text{mod}(p, N_{ZC}) \text{ and} \quad (Eq. 3)$$

$$k_p = \left\lfloor \frac{p}{N_{ZC}} \right\rfloor. \quad (Eq. 4)$$

Note that $m_p$ takes the values from $\{1, \ldots N_{ZC}\}$, while $k_p$ takes on the values $$\left\{0, 1, 2, \ldots, \left\lfloor \frac{N-1}{N_{ZC}} \right\rfloor\right\}$$

To represent the location at "d" different radio frame locations, time-domain cyclic shifts $l_q$, wherein $q=\{0, 1, 2, \ldots, d-1\}$ of the ZC sequence may be used. In one embodiment cyclic shift $l_q$ is used for the q-th position in the M-frame.

Thus, the N-SSS sequence is given by:

$$s_{p,q}(n) = a_p(n) e^{-\frac{j2\pi l_q n}{N_{ZC}}} \quad (Eq. 5)$$

where the subscript p={0, 1, 2, N−1} denotes the cell ID and the subscript q determines the location of the N-SSS, i.e., the number of N-SSS in the M-subframe duration (Tms) that have occurred before the current N-SSS. The time domain cyclic shifts are defined as:

$$c_q(n) = e^{-\frac{j2\pi l_q n}{N_{SSS} * N_{sc}}}, \quad (Eq. 6)$$

$$l_q = q \left\lfloor \frac{N_{SSS} * N_{sc}}{d_{max}} \right\rfloor$$

where $d_{max}$ is the maximum number of SSS defined per M-frame.

In another embodiment, time domain cyclic shifts are defined as:

$$c_q(n) = e^{-\frac{j2\pi l_q \text{mod}(n, N_{sc})}{d_{max}}}, \quad l_q = q = \{0, 1, 2, \ldots, d-1\} \quad (Eq. 7)$$

In this case, all SSS-OFDM symbols will contain the same phase rotational sequence. The symbols may be coherently or non-coherently combined at the receiver to obtain the cyclic shift and thus the M-frame location.

One example of the time domain shifts for $N_{ZC}=71$ & $d_{max}=8$ are:

$l_0=0, l_1=9, l_2=18, l_3=27, l_4=36, l_5=45, l_6=54, l_7=63$

Another example of the time domain shifts for $N_{ZC}=131$ & $d_{max}=4$ are:

$l_0=0, l_1=33, l_2=66, l_3=99$, etc.

where:

$$a_p(n) = e^{-\frac{j\pi m_p n(n+1)}{N_{ZC}}} b_{k_p}(n), \quad (Eq. 8)$$

$n = \{0, 1, \ldots, N_{ZC} - 1\}$, where $b_{k_p}(n)$ is the scrambling sequence.

The scrambling sequence may be an M-sequence or a pseudo-noise PN sequence with the $k_p$ different sequences chosen to have good autocorrelation and cross-correlation properties. In one embodiment, the scrambling sequence may be BPSK (−1 and 1 or 0 and 1) or QPSK (1, −1, +j, and −j) symbols.

One example of the scrambling sequence is given below for $$K_p = \left\{0, 1, 2, \ldots, \left\lfloor \frac{N-1}{N_{ZC}} \right\rfloor\right\}: \quad (Eq. 9)$$

$b_{k_p}(n) = b(\text{mod}(n - c(k_p), N_{Zc}))$ $n = \{0, 1, \ldots, N_{ZC} - 1\}$ $$b(n+6) = \text{mod}(b(n) + b(n+1), 2), \quad (Eq. 10)$$

$n = \{0, 1, \ldots, N_{ZC} - 6\}$, $$b(0) = 1, b(m) = 0, m = \{1, 2, 3, 4, 5\} \quad (Eq. 11)$$

Here $c(k_p)$ are the cyclic shifts applied to the scrambling sequence.

$$c(k_p) = k_p \left( \left\lfloor \frac{N-1}{N_{ZC}} \right\rfloor + 1 \right) m = \{1, 2, 3, 4, 5\} \quad (Eq. 12)$$

Figure 4:
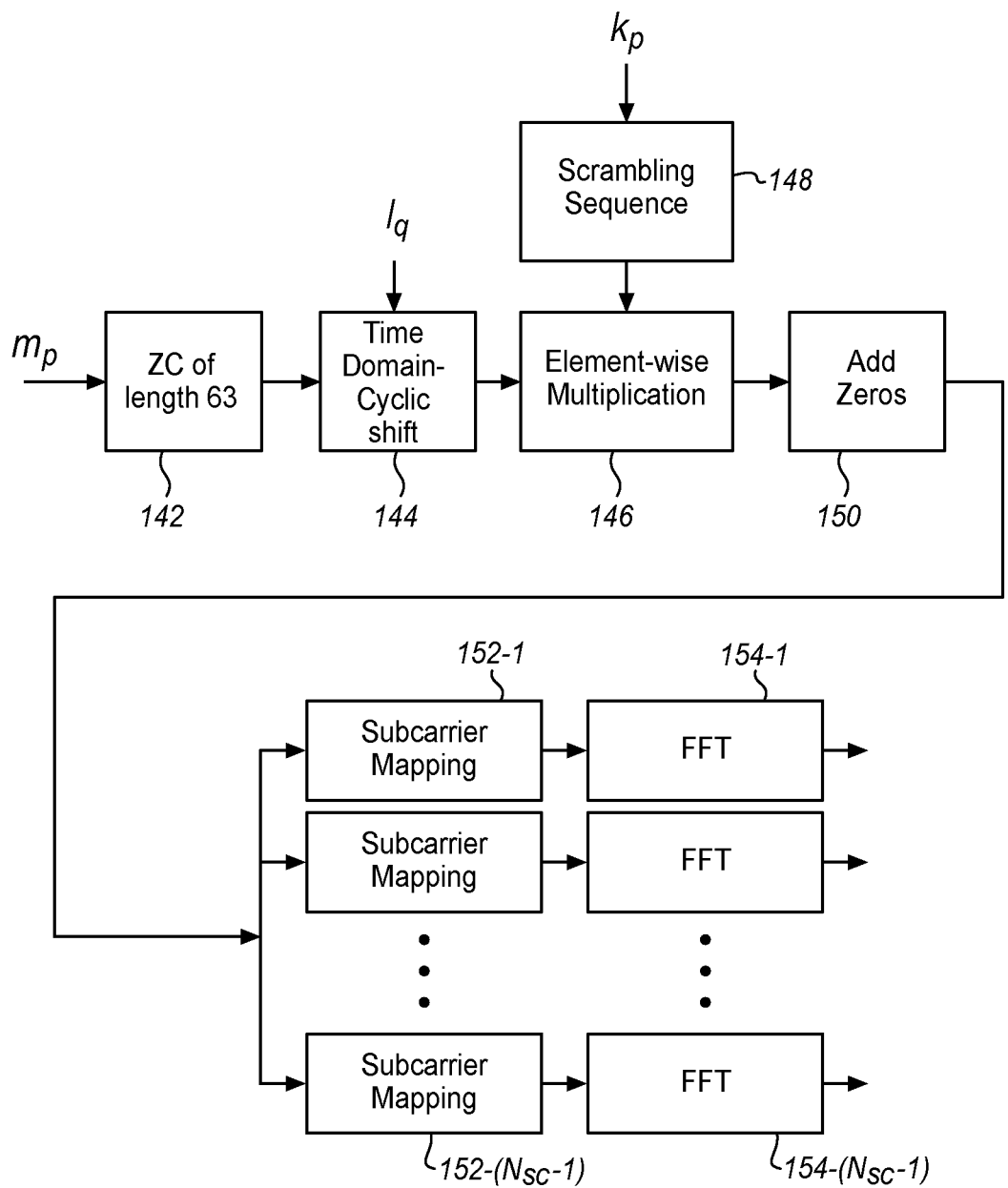
FIG. 4 is a block diagram of a portion of an example transmitter that generates SSS symbols according to an embodiment.

FIG. 4 is a block diagram of a portion of an example transmitter for the N-SSS generation described above. The described operations may be performed in a general purpose processor, a digital signal processor (DSP), application specific integrated circuit (ASIC), or firmware in one or more dedicated devices. The process receives root index, e.g. the $m_p$ signals and generates the ZC (Zadoff-Chu) sequences of any selected length in a first process 142. In this example, each ZC sequence has a length of 63, but any other length may be used, as desired. The ZC signal is fed to a time domain cyclic shift 144 that also receives the time domain cycle shift $l_q$, and then applies it to the ZC sequences. The shifted sequences are then fed into element-wise multiplication 146. Alternatively, the cyclic shift may be performed after the multiplication.

A scrambling sequence index $k_p$ is supplied to generate a scrambling sequence 148. The sequence is then fed to the multiplier 146 and the product is supplied to an add zeroes operation 150. This result is then mapped to subcarriers in a sequence of mappers 152-0 to 152-$N_{SC}$−1. The final mapped signals are then prepared for modulation and transmission. As shown this may begin with an IFFT 154-0 to 154-$N_{SC}$−1 for each signal. The signals are then combined with other signals, encoded, up converted, etc. for transmission. In one example $N_{SC}$ is 504 for 504 different cell IDs, so that there are 504 subscriber mapping block and 504 IFFT blocks. These blocks are shown as operating in parallel but there may also be some serial operations.

In one embodiment, the subcarriers are mapped "in order", i.e., 0 to $N_{SC}$−1 subcarriers are mapped for symbol 0, then 0 to $N_{SC}$−1 subcarriers are mapped for symbol 1, and so on, i.e., 0 to $N_{SC}$−1 subcarriers are mapped for all symbols 0, 1, 2, ..., $N_{SSS}$−1 in order. An example subcarrier mapping for $N_{SSS}$=6 and $N_{SC}$=12 is illustrated in FIG. 5.

Figure 5:
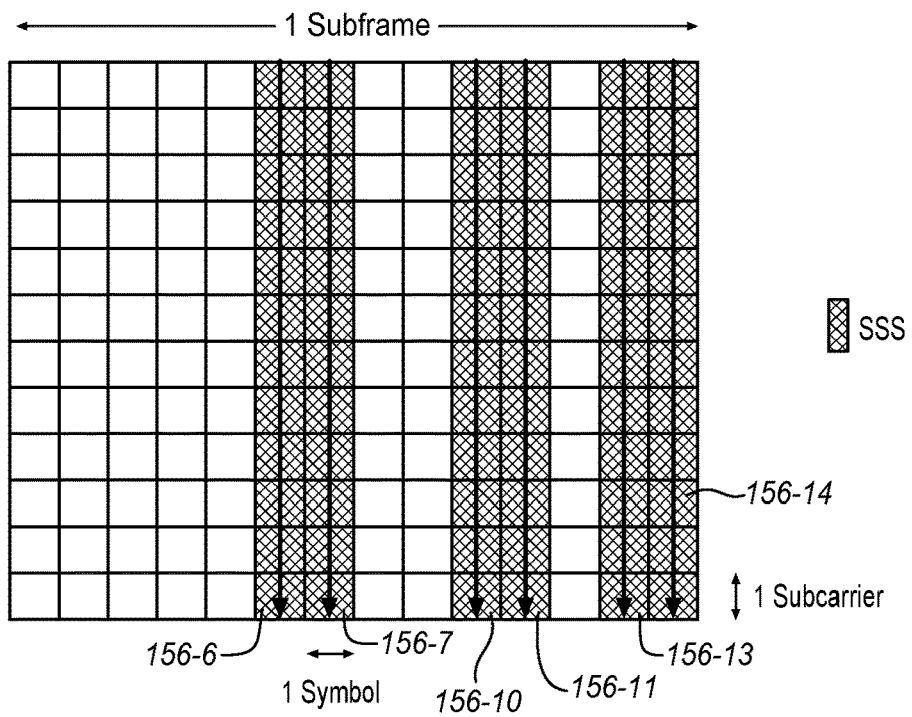
FIG. 5 is a diagram of at least a portion of a subframe with sequential symbols on the horizontal axis and subcarriers in the frequency domain on the vertical axis according to an embodiment.

FIG. 5 is a diagram of at least a portion of a subframe with sequential symbols 156 on the horizontal axis and subcarriers in the frequency domain on the vertical axis. As shown, some of the symbols of the subframe include N-SSS sequences. The symbols are 6, 7, 10, 11, 13, and 14, identified as 156-6, 7, 10, 11, 13, and 14. Different symbol locations may be used to suit different implementations.

If differential decoding is used to obtain the root of the ZC sequence at the receiver, this subcarrier loading can suffer from some performance degradation because the channel might be discontinuous across ZC symbols extracted from different OFDM symbols within a subframe.

Figure 6:
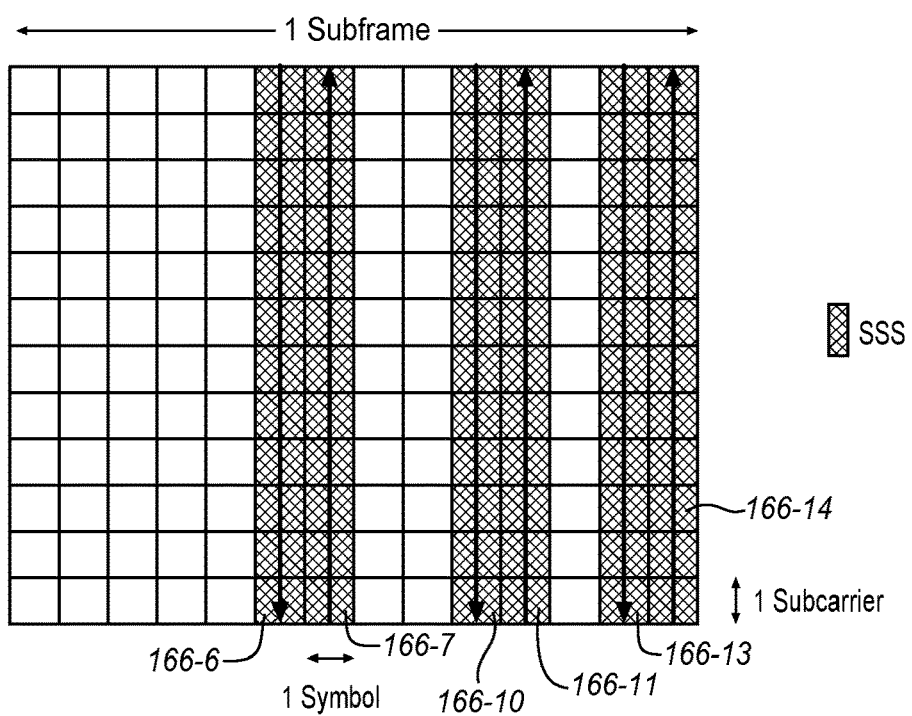
FIG. 6 is a diagram of at least a portion of an alternative subframe with sequential symbols on the horizontal axis and subcarriers in the frequency domain on the vertical axis according to an embodiment.

In another embodiment, the subcarriers are mapped in a "zig-zag" manner, i.e., 0 to $N_{SC}-1$ subcarriers are mapped for symbol 0, then $N_{SC}-1$ to 0 are mapped for symbol 1, 0, to $N_{SC}-1$ are mapped for symbol 2 and so on. An example subcarrier mapping for $N_{SSS}=6$ and $N_{SC}=12$ is illustrated in FIG. 6. This subcarrier loading can help in improving the decoding performance if differential decoding is used at the receiver to recover the root of the ZC sequences because this subcarrier mapping ensures that the channel over consecutive ZC symbols that is used during differential decoding is continuous.

FIG. 6 is a diagram of at least a portion of a subframe with sequential symbols 166 on the horizontal axis and subcarriers in the frequency domain on the vertical axis. As shown some of the symbols of the subframe include N-SSS sequences. The symbols are 6, 7, 10, 11, 13, and 14, identified as 156-6, 7, 10, 11, 13, and 14. Different symbol locations may be used to suit different implementations.

N-SSS Configurations to Indicate TDD/FDD

In addition to the indication of the physical cell ID of the transmitting cell, example embodiments provide options to indicate TDD/FDD configurations using the N-SSS. This can be done in at least two ways.

A first way is to keep the location of N-PSS fixed, and then vary the location of N-SSS within a transmitted frame. The N-SSS location can be set to indicate different TDD/FDD options. For example, in FIG. 2 and FIG. 3, subframes #9, #19, #29, #39, #49, #59, #69, #79 are used for N-SSS transmission. This configuration may be used for FDD and subframes #0, #10, #20, #30, #40, #50, #60, #70 may be used for TDD configuration or vice versa. For the latter case. TDD DL-UL configuration 0 may not be supported since subframe #9 in a radio frame is an UL subframe per TDD DL-UL configuration 0. This may be allowed for by using a different subframe.

A second way is to increase the number of scrambling sequences $k_p$ used in the FIG. 4 process. By doubling the number of scrambling sequences, the scrambling sequences may also be used to identify the TDD/FDD options. The positions of the N-SSS sequences may be unchanged for both FDD and TDD. The correlation output for different hypotheses resulting from different scrambling sequences then identify the TDD/FDD configuration.

Usage of Multiple PSS Sequences for Mode of Operation Indication

In LTE, the time-continuous signal $S_l^{(p)}(t)$ for antenna port p in symbol 1 is defined differently for the uplink and downlink. For an SC-FDMA (Single Carrier Frequency Division Multiple Access) symbol in the uplink, $$s_l^{(p)}(t) = \lceil N_{RB}^{UL} N_{sc}^{RB}/2 \rceil - 1 \; a(p) \cdot e^{j2\pi(k+1/2)\Delta f(t-N_{CP,l}T_s)} \quad \text{(Eq. 13)}$$

$$k = \sum_{-\lfloor N_{RB}^{UL} N_{sc}^{RB}/2 \rfloor} k(-), l$$

for $0 \leq t \leq (N_{CP,l}+N) \times T_s$ where $N_{CP,l}$ is the cyclic prefix length for symbol 1 in a slot, N=2048, $T_s$ is the reference time unit of LTE, $$k^{(-)}=k+\lfloor N_{RB}^{UL} N_{sc}^{RB}/2 \rfloor, N_{RB}^{UL} N_{sc}^{RB} \quad \text{(Eq. 14)}$$

is the number of subcarriers, $\Delta f$ is the subcarrier spacing, and $a_{k,l}^{(p)}$ is the modulated symbol of resource element (k,l) on antenna port p.

Similarly, for an OFDM symbol in the downlink, $$s_l^{(p)}(t) = \sum_{k=-\lfloor N_{RB}^{DL} N_{sc}^{RB}/2 \rfloor}^{-1} a^{(p)} \cdot e^{j2\pi k\Delta f(t-N_{CP,l}T_s)} + \sum_{k=1}^{\lceil N_{RB}^{DL} N_{sc}^{RB}/2 \rceil} a(p) \cdot e^{j2\pi k\Delta f(t-N_{CP,l}T_s)} k^{(+)}, l \text{ for} \quad \text{(Eq. 15)}$$

$$0 \leq t \leq (N_{CP,l} + N) \times T_s \text{ where} \quad \text{(Eq. 16)}$$

$$k^{(-)} = k + \lfloor N_{RB}^{DL} N_{sc}^{RB}/2 \rfloor \text{ and} \quad \text{(Eq. 17)}$$

$$k^{(+)} = k + \lfloor N_{RB}^{DL} N_{sc}^{RB}/2 \rfloor - 1.$$

In other words, for the uplink, the resource element grid is shifted by half the subcarrier spacing to obtain a symmetric spectrum whereas in the downlink, a symmetric spectrum is naturally obtained by not using the DC subcarrier.

Three different modes of operation are envisioned for NB-Iot, according to various embodiments: (1) standalone, (2) guard-band and (3) in-band. For instance, the NB-Iot network can occupy a single PRB of a legacy LTE network within the LTE system bandwidth (in-band mode of operation). Alternatively, it can occupy a single PRB outside the LTE system bandwidth but within the LTE channel. As an example, a 20 MHz (megahertz) LTE channel has 110 PRBs of which 100 PRBs are used for uplink and downlink transmission. The remaining 10 PRBs, 5 on each side of the system bandwidth, may be used for NB-Iot guard-band operation.

In order to minimize the interference between the NB-Iot network and the legacy LTE network, in case the NB-Iot network uses a sub-carrier spacing of $\Delta f=15$ KHz, it may be important to align the resource grid of the two networks in in-band and guard-band operation, i.e., the NB-Iot network may integrate better if it uses the same OFDM signal generation formula as the legacy LTE network, namely, $$s_l^{(p)}(t) = \sum_{k=-\lfloor N_{RB}^{DL} N_{sc}^{RB}/2 \rfloor}^{-1} a^{(p)} \cdot e^{j2\pi k\Delta f(t-N_{CP,l}T_s)} + \sum_{k=1}^{\lceil N_{RB}^{DL} N_{sc}^{RB}/2 \rceil} a(p) \cdot e^{j2\pi k\Delta f(t-N_{CP,l}T_s)} k^{(+)}, l \quad \text{(Eq. 18)}$$

For the standalone mode of operation, however, in order to obtain a symmetric spectrum, it may be beneficial to use the OFDM signal generation formula that shifts the OFDM resource grid by half a sub-carrier spacing since the UE RF bandwidth in NB-Iot is restricted to 180 kHz and the d.c.

sub-carrier has to be used as is the case in the LTE uplink. Hence, for the standalone mode of operation, the OFDM signal generation could follow this formula:

$$s_l^{(p)}(t) = \sum_{k=-\lfloor N_{RB}^{UL}N_{sc}^{RB}/2 \rfloor k(-),l}^{\lceil N_{RB}^{UL}N_{sc}^{RB}/2 \rceil - 1} a^{(p)} \cdot e^{j2\pi(k+1/2)\Delta f(t-N_{CP,l}T_s)} \quad \text{(Eq. 19)}$$

The UE receiver, in order to process the N-SSS sequence, needs to be aware of the mode of operation prior to N-SSS processing in case different modes of operation use different time-continuous signals. In one embodiment, two N-PSS sequences are defined indicating the mode of operation. If the UE receiver detects the sequence corresponding to a mode of operation which shifts the OFDM resource grid, it processes the N-SSS sequence accordingly, i.e., assuming a time-continuous signal $$(N_{RB}^{DL} = N_{RB}^{UL}) \quad \text{(Eq. 20)}$$

then the processing would follow:

$$s_l^{(p)}(t) = \sum_{k=-\lfloor N_{RB}^{UL}N_{sc}^{RB}/2 \rfloor k(-),l}^{\lceil N_{RB}^{UL}N_{sc}^{RB}/2 \rceil - 1} a^{(p)} \cdot e^{j2\pi(k+1/2)\Delta f(t-N_{CP,l}T_s)} \quad \text{(Eq. 21)}$$

If the UE receiver detects the sequence corresponding to a mode of operation which does not shift the OFDM resource grid, then it processes the N-SSS sequence accordingly, i.e., still assuming a time continuous signal:

$$s_l^{(p)}(t) = \sum_{k=-\lfloor N_{RB}^{DL}N_{sc}^{RB}/2 \rfloor k(-),l}^{-1} a^{(p)} \cdot e^{j2\pi k\Delta f(t-N_{CP,l}T_s)} + \sum_{k=1}^{\lceil N_{RB}^{DL}N_{sc}^{RB}/2 \rceil} a(p) \cdot e^{j2\pi k\Delta f(t-N_{CP,l}T_s)}{}_{k(+),l} \quad \text{(Eq. 22)}$$

In another embodiment, three N-PSS sequences are defined indicating the three modes of operation. For example, the guard-band and in-band case may require different rate matching behaviors at the user equipment (UE) or may use different reference signals (RS) for data and/or control channel demodulation. For the in-band case of operation, for instance, the NB-LTE network may map the physical channels and signals to the resource elements in such a way that legacy physical channels and signals of the LTE network are protected. For the guard-band case of operation, on the other hand, no such protection is required. Hence, the eNB transmitter may indicate through three unique N-PSS sequences the mode of operation to the UE receiver, namely, standalone, in-band and guard-band. Depending on which N-PSS sequence the NB-Iot UE receiver detects on a given NB-Iot carrier, it adapts its UE behavior accordingly, e.g., with respect to data channel demodulation, resource mapping, transmission mode selection to name a few.

In yet another embodiment, the three N-PSS sequences are selected in such a way that two of the three N-PSS sequences exhibit the complex conjugate property (i.e., $u_1 = N_{zc} - u_2$) in order to further reduce UE receiver complexity when detecting the three N-PSS sequences.

The present detailed description refers to the accompanying drawings. The same reference numbers may be used in different drawings to identify the same or similar elements. In the description, for purposes of explanation and not limitation, specific details are set forth such as particular structures, architectures, interfaces, techniques, etc. in order to provide a thorough understanding of the various aspects of the claimed embodiments. However, it will be apparent to those skilled in the art having the benefit of the present disclosure that the various aspects of the claimed embodiments may be practiced in other examples that depart from these specific details. In certain instances, descriptions of well-known devices, circuits, and methods are omitted so as not to obscure the description of the embodiments with unnecessary detail.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
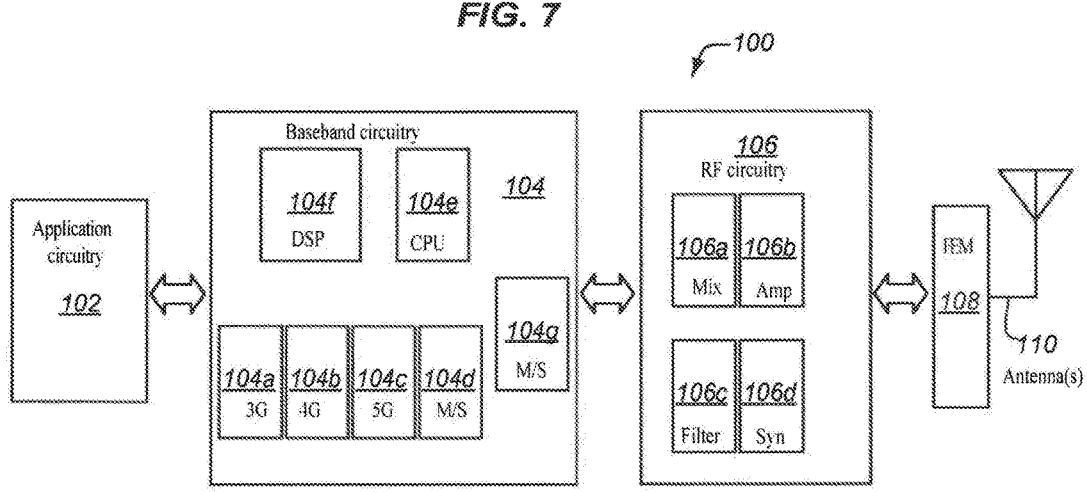
FIG. 7 is a block diagram of an electronic device, such as UE, IOT device, or eNB according to an embodiment.

Embodiments described herein may be implemented into a system using any suitably configured hardware and/or software. FIG. 7 illustrates, for one embodiment, example components of a User Equipment (UE) device 100 or a BS. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second (2G) and third generation (3G) baseband processor 104a, a fourth generation (4G) baseband processor 104b, and/or other baseband processor(s) 104c for other existing generations, generations in development or to be developed in the future (e.g., fifth generation (5G), 6G, etc.).

The baseband circuitry 104 (e.g., one or more of baseband processors 104a-c) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers.

In some embodiments, the baseband circuitry may include one or more audio digital signal processor(s) (DSP) 104f. The audio DSP(s) 104f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

The baseband circuitry 104 may further include memory/storage (M/S) 104d. The memory/storage 104d may be used to load and store data and/or instructions for operations performed by the processors of the baseband circuitry 104. The data and instructions may be read by the processors and are stored in a computer-readable format in the memory or storage medium of 104d or in the individual processors or elsewhere to cause the processors to perform the operations described herein. Memory/storage for one embodiment may include any combination of suitable volatile memory and/or non-volatile memory. The memory/storage (M/S) 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry ("Mix") 106a, amplifier circuitry ("Amp") 106b and filter circuitry ("Filter") 106c. The transmit signal path of the RF circuitry 106 may include filter circuitry 106c and mixer circuitry 106a. RF circuitry 106 may also include synthesizer circuitry ("Syn") 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In embodiments where the electronic device 100 is, implements, is incorporated into, or is otherwise part of an evolved nodeB (eNB), baseband circuitry 104 may be to generate a narrowband secondary synchronization signal (N-SSS) using a Zadoff-Chu (ZC) sequence, wherein a length of the ZC sequence is less than or equal to 73 resource elements; and control radio frequency (RF) circuitry to transmit the N-SSS. The RF circuitry 106 may be to transmit the N-SSS.

In embodiments where the electronic device 100 is, implements, is incorporated into, or is otherwise part of a user equipment (UE), baseband circuitry 104 may be to detect a primary synchronization signal (PSS) received by the RF circuitry 106; derive a mode of operation (MO) from the detected PSS; and process a secondary synchronization signal (SSS) according to the detected MO. In some embodiments, baseband circuitry 104 may be to detect a primary synchronization signal (PSS) received by the RF circuitry 106; derive a mode of operation (MO) from the detected PSS; and process downlink data and control channels according to the detected MO.

Figure 8:
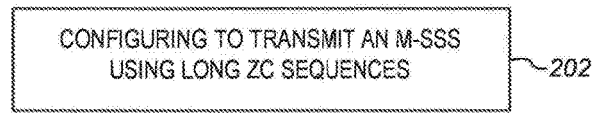
FIG. 8 is a process flow diagram of configuring a device to transmit an N-SSS according to an embodiment.

FIG. 8 is a process flow diagram showing operations that may be performed by the electronic device of FIG. 7. The device may be configured to perform one or more processes, techniques, and/or methods as described herein, or portions thereof. One such process is depicted in FIG. 8. For example, the process may include configuring 202, by an evolved nodeB (eNB), to transmit NB-Iot Secondary Synchronization Signals (N-SSS) from a cell using long Zadoff-Chu (ZC) sequences. The cell may be uniquely identified via a combination of the root of the ZC sequence and the scrambling sequence used to scramble them.

Figure 9:
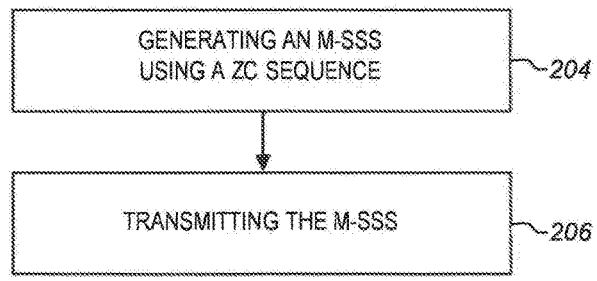
FIG. 9 is a process flow diagram of transmitting to facilitate time and frequency synchronization according to an embodiment.

In some embodiments, the electronic device of FIG. 7 may be configured to perform one or more processes, techniques, and/or methods as described herein, or portions thereof. One such process is depicted in FIG. 9. For example, the process may include generating 204, by an evolved nodeB (eNB), a narrowband secondary synchronization signal (N-SSS) using a Zadoff-Chu (ZC) sequence. A length of the ZC sequence may be less than or equal to 73 resource elements. The process may include transmitting 206 the N-SSS.

Figure 10:
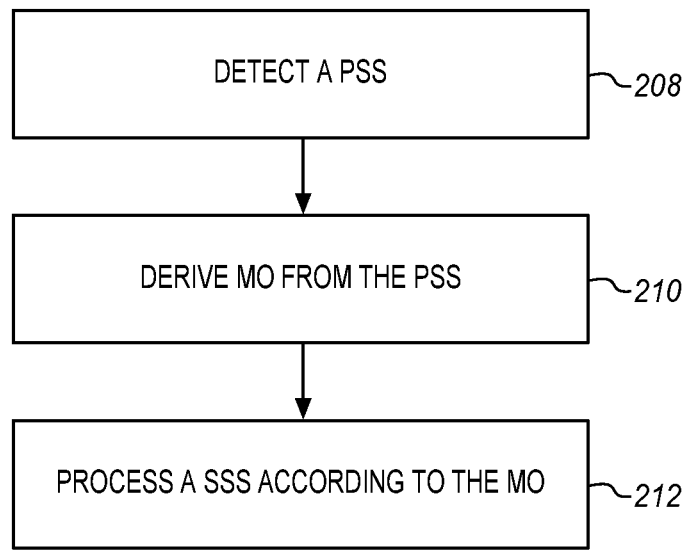
FIG. 10 is a process flow diagram of receiving and processing an N-SSS according to an embodiment.
Figure 11:
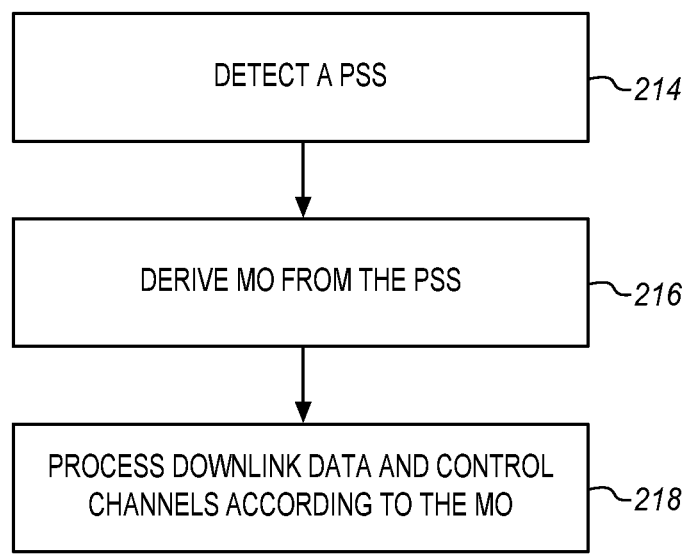
FIG. 11 is a process flow diagram of receiving and processing downlink data according to an embodiment.

In some embodiments, the electronic device of FIG. 7 may be configured to perform one or more processes, techniques, and/or methods as described herein, or portions thereof. One such process is depicted in FIG. 10. For example, the process may include detecting 208 a primary synchronization signal (PSS); deriving 210 a mode of operation (MO) from the detected PSS; and processing 212 a secondary synchronization signal (SSS) according to the detected MO.

In some embodiments, the electronic device of FIG. 6 may be configured to perform one or more processes, techniques, and/or methods as described herein, or portions thereof. One such process is depicted in FIG. 10. For example, the process may include detecting 214 a primary synchronization signal (PSS); deriving 216 a mode of operation (MO) from the detected PSS; and processing downlink data and control channels according to the detected MO.

EXAMPLES

Example 1 may include a system and method of wireless communication for synchronization signal and channel for narrowband long term evolution (NB-Iot), comprising configured, by an evolved nodeB (eNB), to transmit NB-Iot Secondary Synchronization Signal (N-SSS) using long Zadoff-Chu (ZC) sequences, wherein, the cell is uniquely identified via a combination of the root of the ZC sequence and the scrambling sequence used to scramble them.

Example 2 may include the method of example 1 or some other example herein, wherein d (for e.g., d=4, 8) different time-domain cyclic shifts are defined to indicate the location of the N-SSS in an 80 millisecond (ms) M-frame.

Example 3 may include the method of example 1 or some other example herein, wherein a NZC length ZC sequence is generated, where NZC<72 (for e.g., 67, 71, etc.) and extended to occupy 72 resources either by:
 padding with appropriate number of zeros; and/or
 cyclically extending ZC sequences to length 72.

Example 4 may include the method of example 1 or some other example herein, wherein the eNB configures FDD/TDD by either:
 sending N-SSS at different locations. For example, sending N-SSS 5 subframes before N-PSS for TDD and 5 subframes after N-PSS for FDD; and/or
 using different scrambling sequences for TDD and FDD.

Example 5 may include a method comprising;
 a UE detecting a primary synchronization signal (PSS);
 said UE deriving a mode of operation from the detected PSS;
 said UE processing a secondary synchronization signal (SSS) according to the detected mode of operation.

Example 6 may include a method comprising;
 a UE detecting a primary synchronization signal (PSS);
 said UE deriving a mode of operation from the detected PSS;
 said UE processing downlink data and control channels according to the detected mode of operation.

Example 7 may include a method of wireless communication for synchronization signal and channel for narrowband long term evolution (NB-Iot), comprising:
 generating, by an evolved nodeB (eNB), a narrowband secondary synchronization signal (N-SSS) using a Zadoff-Chu (ZC) sequence, wherein a length of the ZC sequence is less than or equal to 73 resource elements; and
 transmitting the N-SSS.

Example 8 may include the method of example 7 or some other example herein, wherein a cell associated with the eNB includes a cell identifier (cell ID) based on a combination of a root of the ZC sequence and a scrambling sequence used to scramble the ZC sequence and/or the cell ID.

Example 9 may include the method of example 7 or some other example herein, wherein d different time-domain cyclic shifts are defined to indicate the location of the N-SSS in an 80 millisecond (ms) M-frame, wherein d is equal to 4 or 8.

Example 10 may include the method of example 9 or some other example herein, wherein the d different time-domain cyclic time shifts are applied to a frequency domain ZC sequence for frame synchronization information.

Example 11 may include the method of example 8 or some other example herein, wherein the scrambling sequence is a maximum length sequence (M-sequence) or a pseudo-noise (PN) sequence.

Example 55 may include the method of example 8 or some other example herein, wherein OFDM symbols corresponding to each secondary synchronization signal (SSS) contains a same phase rotational sequence.

Example 12 may include the method of example 8 or some other example herein, wherein the scrambling sequence may be binary phase-shift key (BPSK) (−1 and 1 or 0 and 1) symbols or quadrature phase-shift key (QPSK) (1, −1, +j, and −j) symbols.

Example 13 may include the method of example 7 or some other example herein, wherein the ZC sequence is generated to have a size of less than 72 and extended to occupy 72 resources by padding with an appropriate number of zeros and/or cyclically extending the ZC sequence to have a length of 72.

Example 14 may include the method of example 7 or some other example herein, wherein the eNB configures FDD/TDD by sending one or more N-SSS subframes before one or more narrowband primary synchronization signals (N-PSS) for TDD and one or more subframes after N-PSS for FDD, and/or by using different scrambling sequences for TDD and FDD.

Example 15 may include the method of example 7 or some other example herein, wherein a location of the N-PSS is fixed and a location of N-SSS is based on a TDD configuration and a FDD configuration.

Example 56 may include the method of example 7 or some other example herein, further comprising:
 mapping a plurality of OFDM symbols for each of a plurality of subcarriers in a consecutive order.

Example 57 may include the method of example 7 or some other example herein, further comprising:
 mapping a plurality of OFDM symbols for each of a plurality of subcarriers in a zig-zag order.

Example 16 may include the method of example 15 or some other example herein, wherein subframes #9, #19, #29, #39, #49, #59, #69, #79 are used for N-SSS transmission for the FDD configuration and subframes #0, #10, #20, #30, #40, #50, #60, #70 are used for N-SSS transmission for the TDD configuration.

Example 17 may include the method of example 15 or some other example herein, wherein subframes #0, #10, #20, #30, #40, #50, #60, #70 are used for N-SSS transmission for the FDD configuration and subframes #9, #19, #29, #39, #49, #59, #69, #79 are used for N-SSS transmission for the TDD configuration.

Example 18 may include a method comprising:
 detecting, by a user equipment (UE), a primary synchronization signal (PSS);
 deriving, by the UE, a mode of operation (MO) from the detected PSS;
 processing, by the UE, a secondary synchronization signal (SSS) according to the detected MO.

Example 19 may include a method comprising;
 detecting, by a user equipment (UE), a primary synchronization signal (PSS); deriving, by the UE, a mode of operation (MO) from the detected PSS; processing, by the UE, downlink data and control channels according to the detected MO.

Example 20 may include the method of example 18 or 19 or some other example herein, wherein the MO includes one of a standalone MO, a guard-band MO, or an in-band MO.

Example 21 may include the method of example 20 or some other example herein, wherein, in the in-band MO, the PSS and/or the SSS occupy a single physical resource block (PRB) of a legacy long term evolution (LTE) network within the LTE system bandwidth.

Example 22 may include the method of example 20 or some other example herein, wherein, in the guard-band MO, the PSS and/or the SSS occupy a single PRB outside the LTE system bandwidth but within the LTE channel.

Example 23 may include the method of example 20 or some other example herein, wherein, in the standalone MO, the PSS and/or the SSS occupy a single PRB shifted by an orthogonal frequency division multiplexing (OFDM) resource grid by half a sub-carrier spacing.

Example 24 may include the method of example 20 or some other example herein, wherein two primary synchronization signals (N-PSS) sequences indicate the MO, wherein a first N-PSS sequence indicates an MO which shifts the OFDM resource grid and a second MPSS sequence indicates an MO which does not shift the OFDM resource grid.

Example 25 may include the method of example 20 or some other example herein, wherein each of the standalone MO, the in-band MO, and the guard-band MO are indicated by a corresponding unique N-PSS sequence, wherein the detecting includes detecting a unique MPSS sequence on a corresponding NB-Iot carrier.

Example 26 may include the method of example 24 or some other example herein, wherein the unique N-PSS sequences are selected in such a way that at least two of the unique N-PSS sequences exhibit a complex conjugate property.

Example 27 may include an apparatus to be implemented in an evolved nodeB (eNB), the apparatus comprising: baseband circuitry to generate a narrowband secondary synchronization signal (N-SSS) using a Zadoff-Chu (ZC) sequence, wherein a length of the ZC sequence is less than or equal to 73 resource elements; and control radio frequency (RF) circuitry to transmit the N-SSS.

Example 28 may include the apparatus of example 27 or some other example herein, wherein a cell associated with the eNB includes a cell identifier (cell ID) based on a combination of a root of the ZC sequence and a scrambling sequence used to scramble the ZC sequence and/or the cell ID.

Example 29 may include the apparatus of example 27 or some other example herein, wherein d different time-domain cyclic shifts are defined to indicate the location of the N-SSS in an 80 millisecond (ms) M-frame, wherein d is equal to 4 or 8.

Example 30 may include the apparatus of example 29 or some other example herein, wherein the d different time-domain cyclic time shifts are applied to a frequency domain ZC sequence for frame synchronization information.

Example 31 may include the apparatus of example 27 or some other example herein, wherein the scrambling sequence is a maximum length sequence (M-sequence) or a pseudo-noise (PN) sequence.

Example 58 may include the method of example 27 or some other example herein, wherein OFDM symbols corresponding to each secondary synchronization signal (SSS) contains a same phase rotational sequence.

Example 32 may include the apparatus of example 28 or some other example herein, wherein the scrambling sequence may be binary phase-shift key (BPSK) (−1 and 1 or 0 and 1) symbols or quadrature phase-shift key (QPSK) (1, −1, +j, and −j) symbols.

Example 33 may include the apparatus of example 27 or some other example herein, wherein the baseband circuitry is to generate the ZC sequence to have a size of less than 72 and extended to occupy 72 resources by padding with an appropriate number of zeros and/or cyclically extending the ZC sequence to have a length of 72.

Example 34 may include the apparatus of example 27 or some other example herein, wherein the baseband circuitry is to configure FDD/TDD by controlling the RF circuitry to send one or more N-SSS subframes before one or more primary synchronization signals (N-PSS) for TDD and one or more subframes after N-PSS for MD, and/or by using different scrambling sequences for TDD and FDD.

Example 35 may include the apparatus of example 27 or some other example herein, wherein a location of the N-PSS is fixed and a location of N-SSS is based on a TDD configuration and a FDD configuration.

Example 59 may include the apparatus of example 27 or some other example herein, wherein the baseband circuitry is to map a plurality of OFDM symbols for each of a plurality of subcarriers in a consecutive order.

Example 60 may include the apparatus of example 27 or some other example herein, wherein the baseband circuitry is to map a plurality of OFDM symbols for each of a plurality of subcarriers in a zig-zag order.

Example 36 may include the apparatus of example 35 or some other example herein, wherein subframes #9, #19, #29, #39, #49, #59, #69, #79 are used for N-SSS transmission for the FDD configuration and subframes #0, #10, #20, #30, #40, #50, #60, #70 are used for N-SSS transmission for the TDD configuration.

Example 37 may include the apparatus of example 35 or some other example herein, wherein subframes #0, #10, #20, #30, #40, #50, #60, #70 are used for N-SSS transmission for the FDD configuration and subframes #9, #19, #29, #39, #49, #59, #69, #79 are used for N-SSS transmission for the TDD configuration.

Example 38 may include an apparatus to be implemented in a user equipment (UE), the apparatus comprising baseband circuitry coupled with radio frequency (RF) circuitry to detect a primary synchronization signal (PSS); derive a mode of operation (MO) from the detected PSS; and process a secondary synchronization signal (SSS) according to the detected MO.

Example 39 may include an apparatus to be implemented in a user equipment (UE), the apparatus comprising baseband circuitry coupled with radio frequency (RF) circuitry to detect a primary synchronization signal (PSS); derive a mode of operation (MO) from the detected PSS; and process downlink data and control channels according to the detected MO.

Example 40 may include the apparatus of example 38 or 39 or some other example herein, wherein the MO includes one of a standalone MO, a guard-band MO, or an in-band MO.

Example 41 may include the apparatus of example 40 or some other example herein, wherein, in the in-band MO, the PSS and/or the SSS occupy a single physical resource block (PRB) of a legacy long term evolution (LTE) network within the LTE system bandwidth.

Example 42 may include the apparatus of example 40 or some other example herein, wherein, in the guard-band MO, the PSS and/or the SSS occupy a single PRB outside the LTE system bandwidth but within the LTE channel.

Example 43 may include the apparatus of example 40 or some other example herein, wherein, in the standalone MO, the PSS and/or the SSS occupy a single PRB shifted by an orthogonal frequency division multiplexing (OFDM) resource grid by half a sub-carrier spacing.

Example 44 may include the apparatus of example 40 or some other example herein, wherein two narrowband primary synchronization signal (N-PSS) sequences indicate the MO, wherein a first N-PSS sequence indicates an MO which shifts the OFDM resource grid and a second N-PSS sequence indicates an MO which does not shift the OFDM resource grid.

Example 45 may include the apparatus of example 40 or some other example herein, wherein each of the standalone MO, the in-band MO, and the guard-band MO are indicated by a corresponding unique N-PSS sequence, wherein the detecting includes detecting a unique MPSS sequence on a corresponding NB-Iot carrier.

Example 46 may include the apparatus of example 45 or some other example herein, wherein the unique N-PSS sequences are selected in such a way that at least two of the unique N-PSS sequences exhibit a complex conjugate property.

Example 47 may include an apparatus comprising means to perform one or more elements of a method described in or related to any of examples 1-26, or any other method or process described herein.

Example 48 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 49 may include an apparatus comprising logic, modules, and/or circuitry to perform one or more elements of a method described in or related to any of examples 1-26, or any other method or process described herein.

Example 50 may include a method, technique, or process as described in or related to any of examples 1-26, or portions or parts thereof.

Example 51 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 52 may include a method of communicating in a wireless network as shown and described herein.

Example 53 may include a system for providing wireless communication as shown and described herein.

Example 54 may include a device for providing wireless communication as shown and described herein.

The foregoing description of one or more implementations provides illustration and description, but is not intended to be exhaustive or to limit the scope of the claimed embodiments to the precise form disclosed. Modifications and variations are possible in light of the above teachings or may be acquired from practice of various implementations of the embodiments.

Further Examples

Example 1 may include one or more computer-readable media having instructions that, when executed, cause an evolved NodeB (eNB) to perform operations to transmit synchronization signals for time and frequency synchronization between the eNB and user equipments (UEs) for narrowband Internet of things (NB-Iot) comprising, generating an NB-Iot Secondary Synchronization Signal (N-SSS) using a Zadoff-Chu (ZC) sequence, scrambling the ZC sequence using a scrambling sequence, and transmitting the resulting scrambled NB-Iot Secondary Synchronization Signal (N-SSS) by the eNB in a periodic manner, wherein, the eNB has a cell identifier and the cell is identified by a combination of the root of the ZC sequence and the scrambling sequence.

Example 2 may include the media of example 1 or any of the other examples described herein, wherein the scrambling sequence is a maximum length sequence (M-sequence) or a pseudo-noise (PN) sequence.

Example 3 may include the media of example 1 or 2 or any of the other examples described herein, wherein the scrambling sequence is formed of binary phase-shift key (BPSK) (−1 and 1 or 0 and 1) symbols or quadrature phase-shift key (QPSK) (1, −1, +j, and −j) symbols.

Example 4 may include the media of any one or more of the above examples or any of the other examples described herein, wherein the N-SSS is mapped to NSSS symbols with NSC subcarriers in each symbol, so that the mapped N-SSS has a size corresponding to NSSS*NSC.

Example 5 may include the media of example 4 or any of the other examples described herein, wherein the ZC sequence is generated to have a size NZC of less than NSC and extended to occupy NSSS*NSC resources by cyclically extending the ZC sequence to have a length of NSSS*NSC.

Example 6 may include the media of example 4 or any of the other examples described herein, wherein the ZC sequence is generated to have a size of less than 72 and extended to occupy 72 resources by padding with an appropriate number of zeros and/or cyclically extending the ZC sequence to have a length of 72.

Example 7 may include the media of any one or more of the above examples or any of the other examples described herein, the operations further comprising adding a time-domain cyclic shift to the N-SSS before transmitting, wherein one of a plurality of different cyclic shifts are used to indicate a location of the N-SSS within a fixed time duration (M-frame).

Example 8 may include the media of any one or more of the above examples or any of the other examples described herein, wherein d different time-domain cyclic shifts are defined to indicate the location of the N-SSS in, for example, an 80 millisecond (ms) M-frame, and wherein d is equal for example to 4 or 8.

Example 9 may include the media of any one or more of the above examples or any of the other examples described herein, wherein the d different time-domain cyclic time shifts are applied to a frequency domain ZC sequence for frame synchronization information.

Example 10 may include the media of any one or more of the above examples or any of the other examples described herein, wherein the eNB identifies a transmission mode as one of FDD and TDD by sending one or more N-SSS subframes before one or more NB-Iot Primary Synchronization Signal (N-PSS) for TDD and one or more subframes after N-PSS for FDD, and/or by using different scrambling sequences for TDD and FDD.

Example 11 may include the media of any one or more of the above examples or any of the other examples described herein, wherein a location of a N-PSS is fixed within an M-frame and a location of a N-SSS is changed to indicate one of a TDD configuration and a FDD configuration.

Example 12 may include the media of example 10 or any of the other examples described herein, wherein subframes #9, #19, #29, #39, #49, #59, #69, #79 of the M-frame are used for N-SSS transmission for the FDD configuration and subframes #0, #10, #20, #30, #40, #50, #60, #70 of the M-frame are used for N-SSS transmission for the TDD configuration.

Example 13 may include the media of any one or more of the above examples or any of the other examples described herein, wherein the N-SSS is comprised of OFDM symbols, the operations further comprising mapping a plurality of OFDM symbols to each of a plurality of consecutive sub-carriers for transmission or to each of a plurality of subcarriers in a zig-zag order for transmission.

Example 14 may include baseband circuitry of an evolved NodeB (eNB) to perform operations to generate synchronization signals for time and frequency synchronization between the eNB and user equipments (UEs) for narrowband Internet of things (NB-Iot), the baseband circuitry configured to select a Zadoff-Chu (ZC) sequence and a scrambling sequence to represent a cell identifier of the eNB, generate an NB-Iot Secondary Synchronization Signal (N-SSS) using the selected Zadoff-Chu (ZC) sequence and scrambling the ZC sequence using the selected scrambling sequence, and multiplex the resulting NB-Iot Secondary Synchronization Signal (N-SSS) by the eNB into orthogonal frequency division multiplexing (OFDM) symbols in a periodic manner.

Example 15 may include the baseband circuitry of example 14 or any of the other examples described herein, wherein the N-SSS is mapped to NSSS symbols with NSC subcarriers in each symbol, so that the mapped N-SSS has a size corresponding to NSSS*NSC.

Example 16 may include the baseband circuitry of example 14 or 15 or any of the other examples described herein, the operations further comprising adding a time-domain cyclic shift to the N-SSS before transmitting, wherein one of a plurality of different cyclic shifts are used to indicate a location of the N-SSS within a fixed time duration (M-frame).

Example 17 may include an evolved NodeB having the baseband circuitry of any one or more of examples 14-16 or any of the other examples described herein.

Example 18 may include one or more computer-readable media having instructions that, when executed, cause an evolved NodeB (eNB) to perform operations to transmit synchronization signals for time and frequency synchronization between the eNB and user equipments (UEs) for narrowband Internet of things (NB-Iot) comprising, generating a Zadoff-Chu (ZC) sequence using a root, scrambling the ZC sequence using a scrambling sequence, and transmitting a sequence of NB-Iot Primary Synchronization Signals (N-PSS) by the eNB in a periodic manner, using the scrambled ZC sequence, wherein, the eNB has a current mode of operation (MO) wherein the sequence of the N-PSS indicates the MO.

Example 19 may include the media of example 18 or any of the other examples described herein, wherein the MO includes one of a standalone MO, a guard-band MO, and an in-band MO.

Example 20 may include the media of examples 18 or 19 or any of the other examples described herein, wherein in the in-band MO, the PSS and/or the SSS occupy a single physical resource block (PRB) of the M-frame within an LTE system bandwidth.

Example 21 may include the media of any one or more of examples 18-20 or any of the other examples described herein, wherein, in the guard-band MO, the PSS and/or the SSS occupy a single PRB outside an LTE system bandwidth but within an LTE channel.

Example 22 may include the media of any one or more of examples 18-21 or any of the other examples described herein, wherein, in the standalone MO, the PSS and/or the SSS occupy a single PRB shifted by an orthogonal frequency division multiplexing (OFDM) resource grid by half a sub-carrier spacing.

Example 23 may include the media of any one or more of examples 18-22 or any of the other examples described herein, wherein two narrowband primary synchronization signal (N-PSS) sequences indicate the MO, wherein a first N-PSS sequence indicates an MO which shifts the OFDM resource grid and a second N-PSS sequence indicates an MO which does not shift the OFDM resource grid.

Example 24 may include the media of any one or more of examples 18-23 or any of the other examples described herein, wherein each of the standalone MO, the in-band MO, and the guard-band MO are indicated by a corresponding unique N-PSS sequence.

Example 25 may include the media of example 24 or any of the other examples described herein, wherein the unique N-PSS sequences are selected in such a way that at least two of the unique N-PSS sequences exhibit a complex conjugate property.

Example 26 may include the media of any one or more of examples 18-25 or any of the other examples described herein, wherein the MO is a mode for physical resource block usage (PRB) usage of a transmission M frame of the NB-Iot communications.

Example 27 may include the media of any one or more of examples 18-26 or any of the other examples described herein, wherein a receiving User Equipment (UE) detects a unique MPSS sequence on a corresponding NB-Iot carrier, derives the MO from the detected N-PSS sequence, processes a secondary synchronization signal (SSS) according to the detected MO, and processes downlink data and control channels according to the detected MO.

Example 28 may include baseband circuitry of an evolved NodeB (eNB) to perform operations to transmit synchronization signals for time and frequency synchronization between the eNB and user equipments (UEs) for narrowband Internet of things (NB-Iot) comprising the operations of any one or more of examples 18-26 or any of the other examples described herein:

Example 29 may include an evolved NodeB having the baseband circuitry of claim 28 or any of the other examples described herein.

Example 30 may include an apparatus comprising means for performing the operations of any one or more of examples 1-13 or 18-27 or any of the other examples described herein.

Example 31 may include an evolved NodeB (eNB) to perform operations to transmit synchronization signals for time and frequency synchronization between the eNB and user equipments (UEs) for narrowband Internet of things (NB-Iot) comprising, means for generating an NB-Iot Secondary Synchronization Signal (N-SSS) using a Zadoff-Chu (ZC) sequence, means for scrambling the ZC sequence using a scrambling sequence, and means for transmitting the resulting scrambled NB-Iot Secondary Synchronization Signal (N-SSS) by the eNB in a periodic manner, wherein, the eNB has a cell identifier and the cell is identified by a combination of the root of the ZC sequence and the scrambling sequence.

Example 32 may include the eNB of any one or more of the above claims or any of the other examples described herein, further comprising means for adding a time-domain cyclic shift to the N-SSS before transmitting, wherein one of a plurality of different cyclic shifts are used to indicate a location of the N-SSS within a fixed time duration (M-frame).

Example 33 may include the eNB of any one or more of the above claims or any of the other examples described herein, wherein the N-SSS is comprised of OFDM symbols, the eNB further comprising means for mapping a plurality of OFDM symbols to each of a plurality of consecutive subcarriers for transmission or to each of a plurality of subcarriers in a zig-zag order for transmission.

Example 34 may include an evolved NodeB (eNB) to transmit synchronization signals for time and frequency synchronization between the eNB and user equipments (UEs) for narrowband Internet of things (NB-Iot) comprising means for generating a Zadoff-Chu (ZC) sequence using a root, means for scrambling the ZC sequence using a scrambling sequence, and means for transmitting a sequence of NB-Iot Primary Synchronization Signals (N-PSS) by the eNB in a periodic manner, using the scrambled ZC sequence, wherein, the eNB has a current mode of operation (MO) wherein the sequence of the N-PSS indicates the MO.

What is claimed is:

1. One or more non-transitory computer-readable media having instructions that, when executed, cause an evolved NodeB (eNB) to perform operations to transmit synchronization signals for time and frequency synchronization between the eNB and user equipments (UEs) for narrowband Internet of things (NB-IoT) comprising:
   generating an NB-IoT Secondary Synchronization Signal (N-SSS) comprising a Zadoff-Chu (ZC) sequence based on a root index, wherein the root index is determined by performing a modulo operation of a cell identifier of the eNB with respect to a particular number;
   scrambling the ZC sequence using a scrambling sequence that is generated based on a scrambling sequence index, wherein the scrambling sequence index is determined by performing a floor operation of a division of the cell identifier by the particular number; and
   transmitting the NB-IoT Secondary Synchronization Signal (N-SSS) comprising the scrambled ZC sequence by the eNB in a periodic manner, wherein the N-SSS comprises the cell identifier of the eNB that is represented uniquely by a combination of the root index of the ZC sequence and the scrambling sequence index.

2. The one or more non-transitory computer-readable media of claim 1, wherein the scrambling sequence is a maximum length sequence (M-sequence).

3. The one or more non-transitory computer-readable media of claim 1, wherein the
   scrambling sequence is formed of quadrature phase-shift key (QPSK) (1, −1, +j, and −j) symbols.

4. The one or more non-transitory computer-readable media of claim 1, wherein the N-SSS is mapped to $N_{sss}$ symbols with $N_{sc}$ subcarriers in each symbol, so that the mapped N-SSS has a size corresponding to $N_{sss}*N_{sc}$.

5. The one or more non-transitory computer-readable media of claim 4, wherein the ZC sequence is generated to have a size $N_{zc}$ of less than $N_{sc}$ and extended to occupy $N_{sss}*N_{sc}$ resources by cyclically extending the ZC sequence to have a length of $N_{sss}*N_{sc}$.

6. The one or more non-transitory computer-readable media of claim 1, the operations further comprising adding a time-domain cyclic shift to the N-SSS before transmitting, wherein one of a plurality of different cyclic shifts are used to indicate a location of the N-SSS within a fixed time duration.

7. The one or more non-transitory computer-readable media of claim 1, wherein different time-domain cyclic shifts are defined to indicate the location of the N-SSS.

8. The one or more non-transitory computer-readable media of claim 1, wherein the eNB identifies a transmission mode as one of frequency division duplex (FDD) and time division duplex (TDD) by sending one or more N-SSS subframes before one or more NB-IoT Primary Synchronization Signal (N-PSS) for TDD and one or more subframes after N-PSS for FDD, or by using different scrambling sequences for TDD and FDD.

9. The one or more non-transitory computer-readable media of claim 1, wherein a location of a N-PSS is fixed within a time frame and a location of a N-SSS is changed to indicate one of a TDD configuration and a FDD configuration.

10. The one or more non-transitory computer-readable media of claim 9, wherein subframes #9, #19, #29, #39, #49, #59, #69, #79 of the time frame are used for N-SSS transmission for the FDD configuration and subframes #0, #10, #20, #30, #40, #50, #60, #70 of the time frame are used for N-SSS transmission for the TDD configuration.

11. A baseband circuitry of an evolved NodeB (eNB) configured to perform operations to transmit synchronization signals for time and frequency synchronization between the eNB and user equipment (UE) for narrowband Internet of things (NB-IoT) comprising:
   generate a Zadoff-Chu (ZC) sequence based on a root index, wherein the root index is determined by performing a modulo operation of a cell identifier of the eNB with respect to a particular number;
   scramble the ZC sequence using a scrambling sequence that is generated based on a scrambling sequence index, wherein the scrambling sequence index is determined by performing a floor operation of a division of the cell identifier by the particular number; and
   transmit a sequence of NB-IoT Primary Synchronization Signals (N-PSS) and a NB-IoT Secondary Synchronization Signal (N-SSS) comprising the scrambled ZC sequence by the eNB in a periodic manner, wherein the eNB has a current mode of operation (MO) wherein the sequence of the N-PSS indicates the MO, and wherein the N-SSS comprises the cell identifier of the eNB that is represented uniquely by a combination of the root index of the ZC sequence and the scrambling sequence index.

12. The baseband circuitry of claim 11, wherein the MO includes one of a standalone MO, a guard-band MO, and an in-band MO.

13. The baseband circuitry of claim 12, wherein each of the standalone MO, the in-band MO, and the guard-band MO are indicated by a corresponding unique N-PSS sequence.

14. The baseband circuitry of claim 13, wherein the unique N-PSS sequences are selected in such a way that at least two of the unique N-PSS sequences exhibit a complex conjugate property.

15. The baseband circuitry of claim 11, wherein two narrowband primary synchronization signal (N-PSS) sequences indicate the MO, wherein a first N-PSS sequence indicates an MO which shifts orthogonal frequency division multiplex (OFDM) resource grid of one or more symbols carrying the first N-PSS sequence and a second N-PSS sequence indicates an MO which does not shift the OFDM resource grid of one or more symbols carrying the second N-PSS sequence.

16. The baseband circuitry of claim 11 wherein the MO is a mode for physical resource block (PRB) usage of a transmission frame of the NB-IoT communications.

17. The baseband circuitry of claim 11, wherein the N-PSS sequence is transmitted on a corresponding NB-IoT carrier to allow the UE to derive the MO from the detected N-PSS sequence, process a secondary synchronization signal (SSS) according to the derived MO, and process downlink data and control channels according to the derived MO.

18. A user equipment (UE) for narrowband Internet of things (NB-IoT) comprising:
    at least one antenna;
    at least one radio, wherein the at least one radio is configured to communicate with an evolved NodeB (eNB) of a communication network using the at least one antenna; and
    a baseband circuitry coupled to the at least one radio, wherein the baseband circuitry is configured to perform operations to receive synchronization signals for time and frequency synchronization between the UE for NB-IoT and the eNB comprising:
    receive a NB-IoT Secondary Synchronization Signal (N-SSS) from the eNB in a periodic manner, wherein the N-SSS comprises a Zadoff-Chu (ZC) sequence scrambled using a scrambling sequence, wherein the ZC sequence is generated based on a root index, wherein the root index is determined by a modulo operation of a cell identifier of the eNB with respect to a particular number, wherein the scrambling sequence is generated based on a scrambling sequence index, wherein the scrambling sequence index is determined by a floor operation of a division of the cell identifier of the eNB by the particular number, and wherein the cell identifier of the eNB is represented uniquely by a combination of the root index of the ZC sequence and the scrambling sequence index; and
    determine the cell identifier of the eNB from the received N-SSS.

* * * * *